United States Patent [19]

Treiber

[11] Patent Number: 4,489,533
[45] Date of Patent: Dec. 25, 1984

[54] PACKAGE HANDLING IN A FILM WRAPPING MACHINE

[75] Inventor: Fritz F. Treiber, Centerville, Ohio
[73] Assignee: Hobart Corporation, Troy, Ohio
[21] Appl. No.: 446,911
[22] Filed: Dec. 6, 1982
[51] Int. Cl.³ .............................................. B65B 11/06
[52] U.S. Cl. ...................................... 53/228; 53/230; 198/345
[58] Field of Search .................. 198/345; 53/228, 229, 53/230, 231

[56] References Cited
U.S. PATENT DOCUMENTS

| | | | |
|---|---|---|---|
| 2,744,371 | 5/1956 | Hoppe | 53/230 |
| 2,926,473 | 3/1960 | Byland | 53/230 |
| 3,127,722 | 4/1964 | Schoder | 53/230 |

Primary Examiner—W. D. Bray
Attorney, Agent, or Firm—Biebel, French & Nauman

[57] ABSTRACT

In a package wrapping machine wherein packages are transported horizontally on a beyond platform to a wrapping station and deposited at the wrapping station by contact or collision of the package with a package stop as the platform travels beynd the stop, improved package handling apparatus is provided for catching trayed commodities upon rebound from the package stop and for urging them toward the stop such that they are correctly positioned for wrapping. The improved apparatus comprises a ramped projection extending upwardly from the rear of the conveying platform with the ramped projection being formed to facilitate passage beneath a package to be wrapped as the platform travels beyond the package stop. Package restraints at the wrapping station retain packages at the correct position on the wrapping station as the ramped projection passes beneath the trayed commodity. In the preferred embodiment, the conveying platform comprises a plurality of rods and the ramped projection extends from a generally rectangular block which engages the last and the penultimate of the plurality of rods.

20 Claims, 6 Drawing Figures

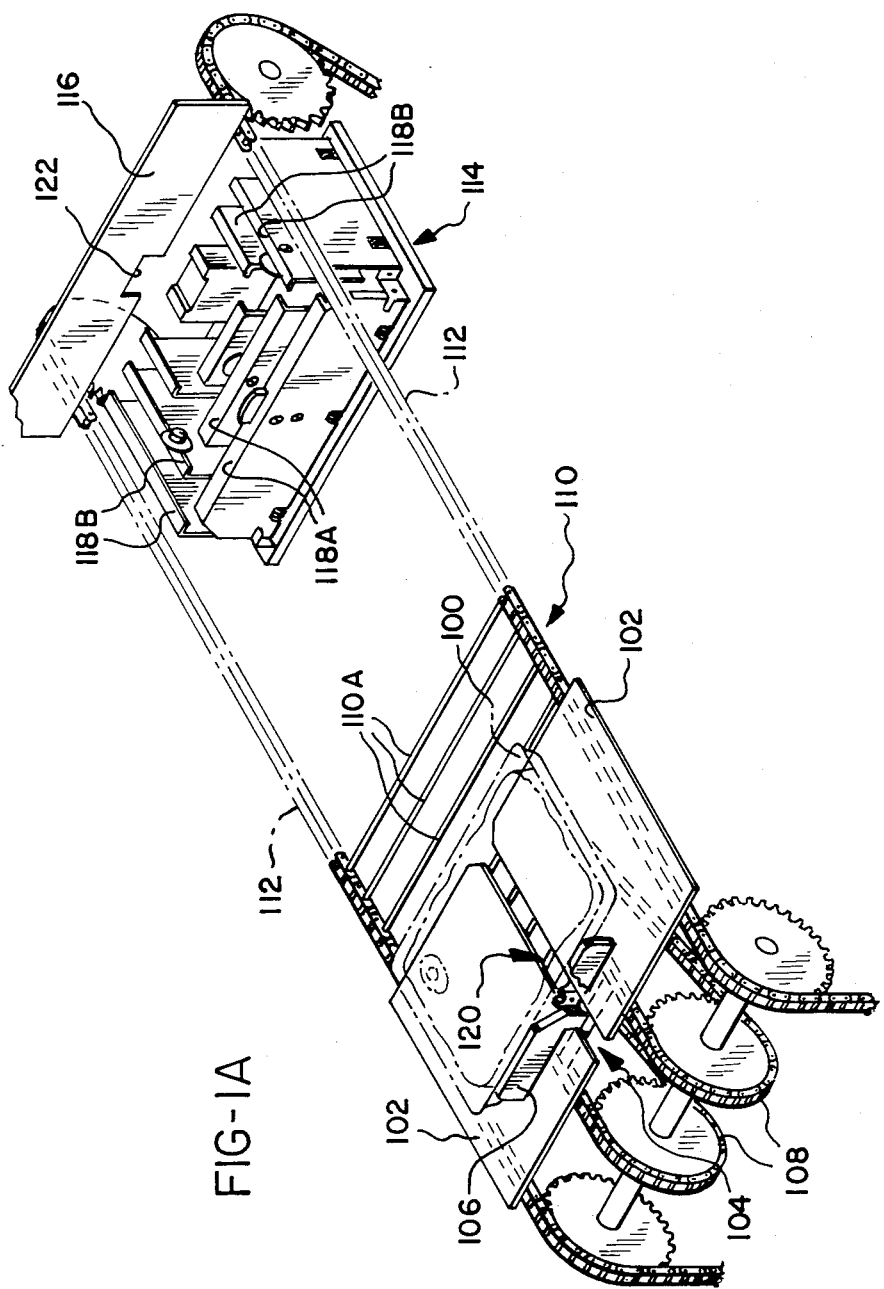

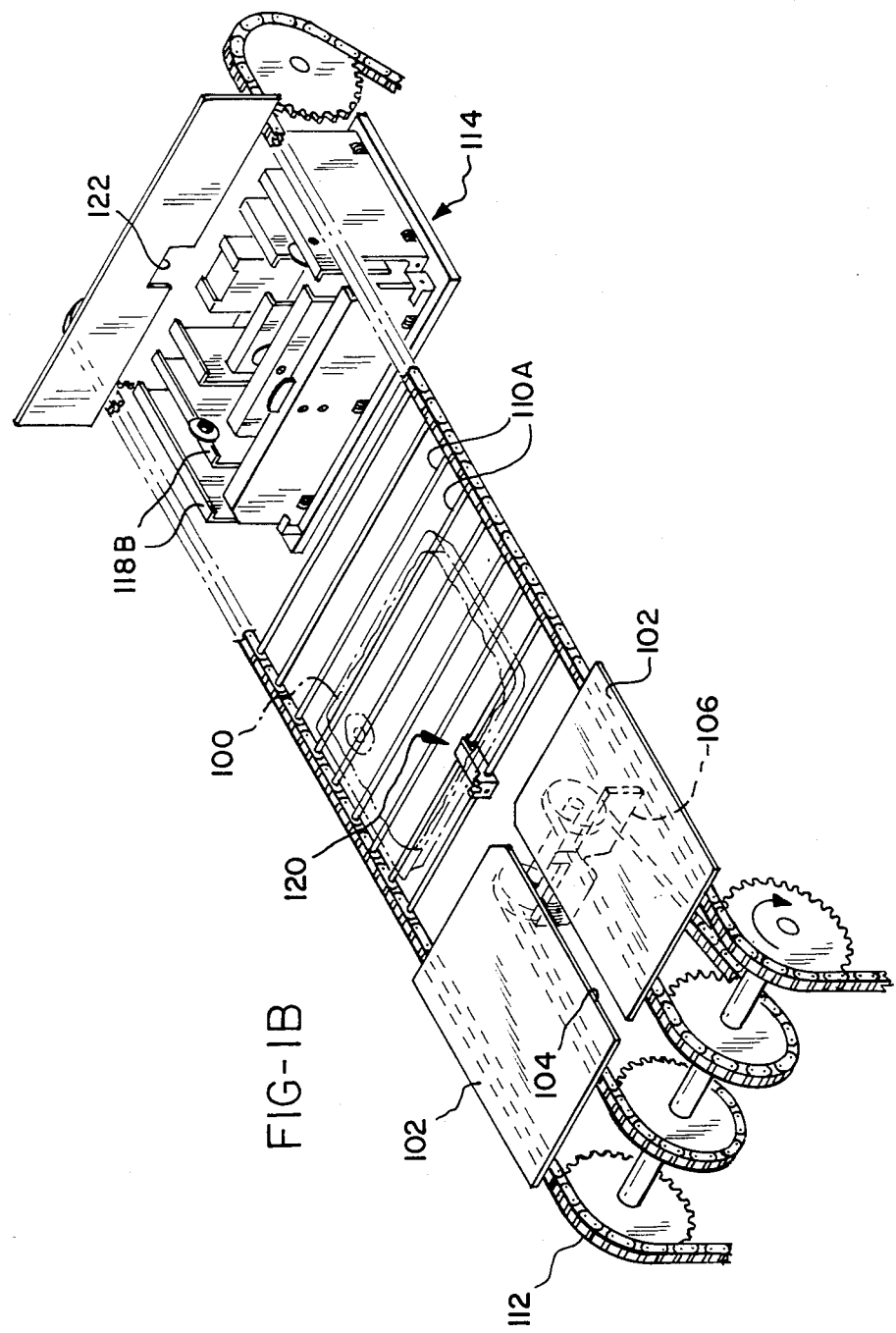

PACKAGE HANDLING IN A FILM WRAPPING MACHINE

BACKGROUND OF THE INVENTION

This invention relates generally to package wrapping machines utilizing thin, stretchable film to wrap and display articles contained in trays and, more particularly, to apparatus for improved handling of the trayed articles within a wrapping machine.

A variety of film wrapping machines are known in the prior art for wrapping articles, for example, agricultural commodities, supported on trays. Typically, a trayed commodity is transported on a conveying platform to a wrapping station where film if wrapped about the commodity oftentimes with the film being folded under the tray and sealed therebeneath to form a display package. In one popular form of wrapping machine, the wrapping station comprises an elevator having collapsible slats spring-biased to a vertical position for supporting the trayed commodity on the upper surface of the vertically extended slats. In this form of machine, the elevator is raised to elevate a trayed commodity into engagement with a sheet of film which is thereafter folder under the tray with the underfolding apparatus collapsing the slats of the elevator against the spring forces.

As a trayed commodity is transported to the wrapping station, the trayed commodity contacts a package stop so that the conveying platform can be moved out from under the tray to leave the trayed commodity correctly positioned at the wrapping station for the wrapping procedure. In modern high speed wrapping machines which transport trayed commodities at relatively high speeds, the contacts with the stop are often quite sharp and can be more accurately termed collisions. These collisions of trayed commodities with the package stop potentially can create considerable reaction forces. However, until recently, almost all operators of such wrapping machines utilized commodity supporting trays which were formed from a variety of plastic foams or pressed fiber. When such trays strike the package stop to deposit the trayed commodities at the wrapping station, the force of the collision is absorbed by the foam or the fiber such that little reaction force is exerted to tend to move the trayed commodity away from the stop.

In what may be a growing trend, a number of local and state regulations have been passed to require a "see-through" tray so that the consumer can view the underside of the package. Such see-through trays, for example, prevent packages from concealing less attractive portions of a commodity beneath attractive portions which show through the film on the top of the package.

While one form of acceptable see-through tray is formed by a lattice work of pressed fiber, a growing number of packagers required to use see-through trays are utilizing a clear plastic tray which has considerable resiliency. Unfortunately, when such a tray is used and the commodity adheres to the tray, considerable reaction forces can be generated by the collision of the trayed commodity with the package stop.

Commodities supported on such resilient plastic trays tend to bounce away from the stop due to the reaction forces and, hence, may be displaced from a correct position for properly wrapping the trayed commodity. At best, packages positioned away from the correct position at the wrapping station are not optimally wrapped and at worst, such packages are positioned such that they jam with a portion of the wrapping machine or indeed are entirely ejected from the wrapping machine. The trayed commodity can be displaced from the stop either longitudinally (toward the package entrance direction), laterally (to one side or the other) or diagonally (at an angle) with the exact displacement depending upon the longitudinal and lateral components of the reaction forces generated by the collision of the trayed commodity with the package stop.

Opaque plastic trays similar in design and resiliency to the clear plastic trays are also being introduced by some tray manufacturers and may make the package displacement problem more widespread within the industry.

Thus, it is apparent that the need exists for an improved package handling system for film wrapping machines when commodities are supported on resilient trays capable of generating substantial reaction forces upon contact with a package stop.

SUMMARY OF THE INVENTION

The present invention solves the package displacement problem encountered in prior art film wrapping machines when a commodity is supported on a resilient tray constructed for example, of thin polypropylene or like material. As the trayed commodity is transported horizontally on a conveying platform to a wrapping station, the trayed commodity contacts or collides with a package stop such that the platform can travel beyond the wrapping station and deposit the trayed commodity at a correct wrapping position upon the wrapping station. When such resilient trays are utilized, the collision between the trayed commodity and the package stop can cause sufficient reaction forces such that the package bounces away from the correct position at the wrapping station.

In accordance with the present invention, projection means are coupled to the conveying platform for catching trayed commodities upon rebound from the package stop due to the resiliency of the tray and the collision with the package stop and for urging trayed commodities back toward the stop so that the trayed commodities are more accurately positioned at the wrapping station. The projection means comprises at least one ramped projection extending upwardly from the rear of the conveying platform with the ramped projection being formed to facilitate passage beneath the tray as the conveying platform travels beyond the package stop. This formation of the ramped projection process the trayed commodity against the package stop and thereafter urges the trayed commodity toward the stop as the ramped projection passes beneath the tray.

Restraining means are also positioned at the wrapping station for retaining the trayed commodity at the correct position at the wrapping station as the ramped projection passes beneath the trayed commodity. The restraining means comprises at least one projection for restraining the trayed commodity against movement longitudinally away from the package stop and at least one projection for restraining the trayed commodity against lateral movement parallel to the package stop. Hence, the restraining means reduces longitudinal, lateral and diagonal displacement of the trayed commodity at the wrapping station.

In the preferred embodiment of the present invention, the conveying platform comprises a plurality of parallel rods supported for travel in a direction perpendicular to the rods and the projection means comprises a generally rectangular block having at least one ramped projection extending upwardly from one end thereof and means for securing the block to at least the last of the plurality of rods. A hole is formed through the block for receiving the last of the rods therethrough and the securing means can comprise a set screw threadedly engaged into the block in a position to engage the last rod. Correct positioning or orientation of the block is ensured by positioning means for pivotally receiving the penultimate of the plurality of rods with the positioning means preferably comprising a slot opening to the front of the block.

In the preferred embodiment, the wrapping station comprises an elevator for supporting and elevating trayed commodities for a wrapping procedure. The elevator comprises hinged slats which are spring-biased to a generally vertical position to support the trayed commodity on the upper edges thereof. The slats comprise at least one rear collapsible slat and at least two side collapsible slats, one side collapsible slat being associated with each side of the elevator and being collapsible from that side, to permit film to be folded under the tray of a trayed commodity. The restraining means comprises at least one projection on at least one rear collapsible slat for restraining the trayed commodity against movement longitudinally away from the package stop and at least one projection on at least one side collapsible slat for restraining the trayed commodity against lateral movement parallel to the package stop.

In the preferred embodiment, the film wrapping machine has a centrally slotted package entrance tray with a package feed-in pusher repetitively passing through the slot. In this embodiment, the ramped projection is sized to fit within the slot of the feed-in tray and is secured to the last of the plurality of rods comprising a transporting platform so that the ramped projection is aligned with the slot in the feed-in tray.

It is, therefore, an object of the present invention to provide an improved package handling system in a film wrapping machine wherein packages are horizontally transported on a platform to a wrapping station and deposited at the wrapping station by contact or collision with a package stop wherein projection means are included on the conveying platform for catching the trayed commodity upon rebound from the package stop and for urging the trayed commodity toward the stop such that the trayed commodity is more accurately positioned at the wrapping station.

It is another object of the present invention to provide an improved package handling system which can be conveniently added to existing film wrapping machines wherein a package conveying platform comprises a plurality of rods which deposit packages at a wrapping station upon contact or collision of a package with a package stop and movement of the rods beyond the package stop wherein projection means comprises a block adapted to engage the last and the penultimate rods of the conveying platform and being sized and positioned thereon to be compatible with the existing wrapping machine.

Other objects and advantages of the invention will be apparent from the following description, the accompanying drawings and the appended claims.

BRIEF DESCRIPTION OF THE DRAWINGS

FIGS. 1A, 1B and 1C are schematic views of the transportation of a trayed commodity from a feed-in tray to a wrapping station/elevator of a wrapping machine.

DETAILED DESCRIPTION OF THE INVENTION

Figure 1C:
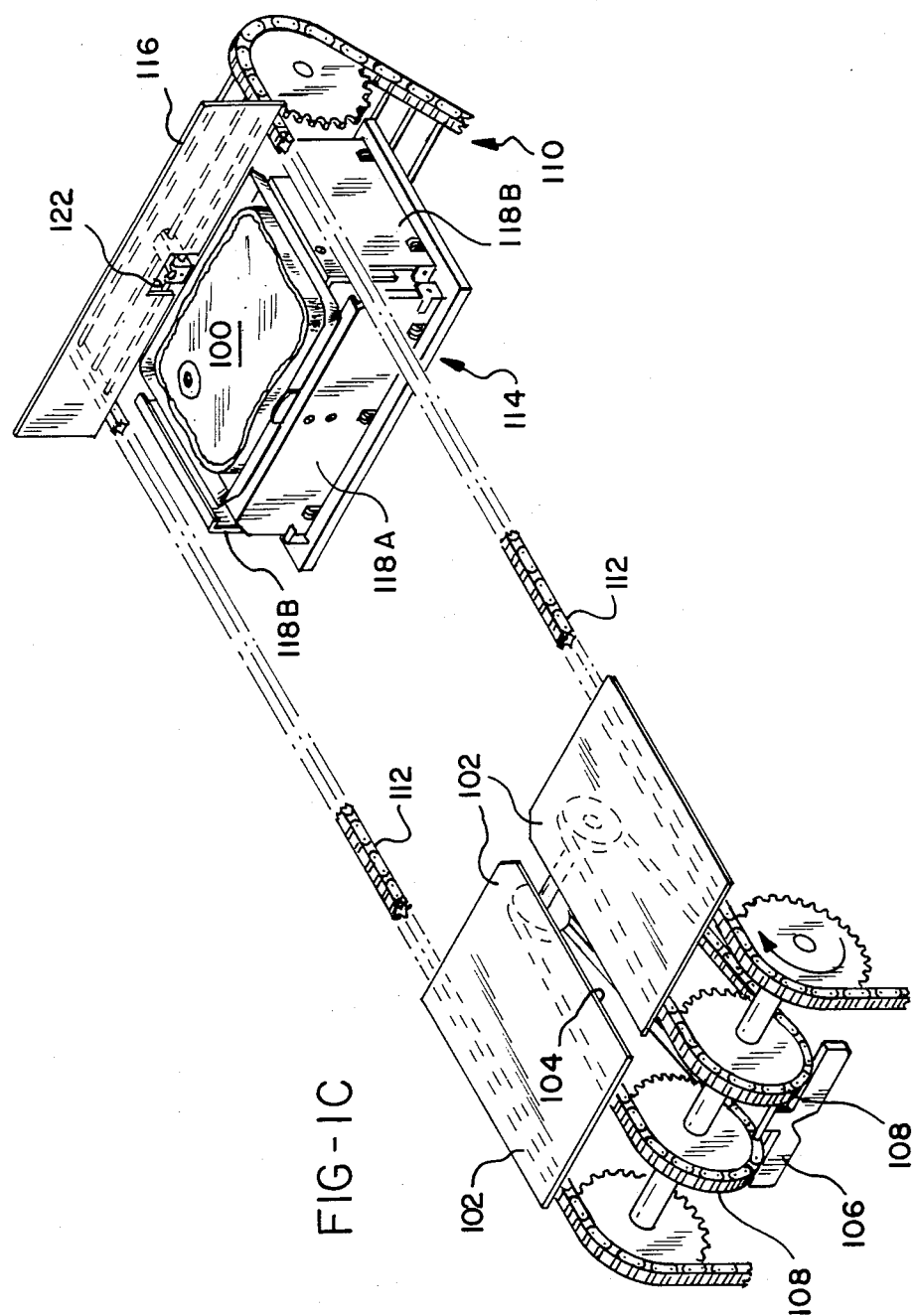

FIGS. 1A through 1C illustrate in schematic form horizontal package feed-in for an elevator wrapping machine with a trayed commodity or package 100 progressing from the feed-in tray to the elevator through the three views. Although an understanding of the operation of the elevator wrapping machine is not necessary for the present invention, a detailed description of the construction and operation of one such machine is included in U.S. patent application Ser. No. 371,892, filed on Apr. 26, 1982, which is assigned to the same assignee as the present application and is incorporated hereinto by reference.

A slotted package feed-in tray 102 includes a central slot 104 through which a package feed-in pusher 106 is repetitively swept by means of drive chains 108 to which the pusher 106 is connected. A platform 110 comprising a plurality of rods 110A which are mounted upon chains 112 receive a trayed commodity from the feed-in tray 102 and transport it to the wrapping station or elevator 114.

The platform 110 proceeds beyond the elevator 114 beneath a package stop 116 such that the package 100 conveyed on the platform 110 contacts or, in modern day high speed wrapping machines, more accurately, collides with the package stop 116 so that the package is deposited on the elevator 114. The elevator 114 includes slats 118 which are spring-biased to a generally vertical position as shown in FIGS. 1A through 1C to receive and support a trayed commodity or package 100 to be wrapped. The slats 118A are mounted so that they can be collapsed from the rear by a rear film underfolder and the slats 118B are hinged so that they can be collapsed from the sides by side film underfolders after the package has been elevated into a sheet of film.

Until recently, commodities typically have been supported on trays comprised of foam material or pressed fiber which tend to absorb the shock of the collision between the trayed commodity and the package stop 116. Accordingly, when such shock absorbing trays are utilized in a film wrapping machine, the reaction forces, which would otherwise tend to bounce trayed commodities or packages away from the stop 116, are absorbed. The packages are then correctly positioned at the wrapping station or elevator 114 so that the remainder of the wrapping process can be performed.

However, when resilient trays such as those constructed from polypropylene or like materials are utilized in the wrapping machine, the trayed commodities or packages sometimes tend to bounce away from the package stop 116. Packages may thus be bounced or displaced away from the correct position for wrapping on the elevator 114 shown in FIG. 1C. Such misplacement can lead to jamming of the wrapping machine or may even cause the package 100 to fall from the elevator 114.

Bounce problems are particularly likely if the commodity adheres to the tray such that the entire inertia of the package is exerted against the forward lip of the tray which contacts the package stop 116 and if the platform has insufficient frictional contact with the tray bottom to restrain such bouncing. Frictional contact between the platform 110 and tray bottoms is greatly reduced when the wrapping machine is used to wrap meat. The reduced friction is due to the lubricating characteristic of natural animal fats which invariably coat the platform 110 even in the most cleanly maintained machine after only a limited number of packages are wrapped.

A variety of attempts were made to overcome the bounce problem prior to the development of the improved handling apparatus of the present invention. For example, the rods 110A were rubber coated; O-rings were positioned over the rods 110A; and various modifications of the package stop 116 were made. Each of these attempts either failed when the platform became coated with animal fat or created mechanical difficulties for the wrapping operation of the machine.

In accordance with the present invention, projection means 120 are coupled to the conveying platform 110. The projection means 120 catches the lower rear portion of the tray of a trayed commodity upon rebound from the package stop 116 and urges the trayed commodity toward the package stop so that the trayed commodity is correctly positioned on the elevator 114 for the remainder of the wrapping process. The projection means 120 passes through a notched opening 122 in the bottom edge of the package stop 116.

Figure 2:
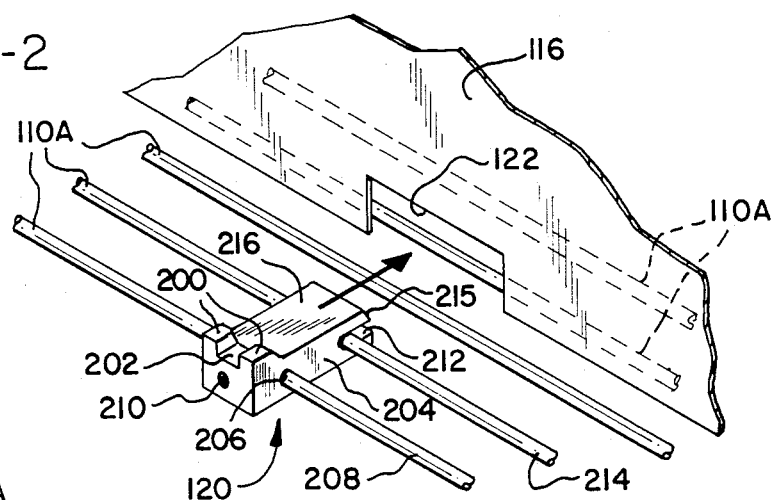
FIG. 2 is a perspective view of the improvement in accordance with the present invention.

The projection means 120 is shown in perspective in FIG. 2. The projection means 120 comprises a ramped projection 200 which has a central slot 202 to accommodate a package sensing swing arm in the wrapping machine disclosed in the above-referenced U.S. patent application Ser. No. 371,892. The slot 202 prevents false sensing of packages in that machine. The ramped projection 200 extends upwardly from the rear of a generally rectangular block 204 which includes a hole 206 for receiving the last rod 208 of the plurality of rods 110A forming the package conveying platform 110.

The block 204 is secured to the last rod 208 of the platform 110 by a set screw 210 which is threadingly engaged through the rear of the block 204 to engage the last rod 208. The block 204 includes a slot 212 opened to the front of the block for pivotally receiving the penultimate rod 214 of the rods 110A. The forward edge of the block 204 above the slot 212 includes an incline 215 to slide under packages prior to engagement by the package pusher 106. The block 204 is secured to approximately the center of the rod 208 so that as the platform 110 passes under the feed-in tray 102, the projection means 120 passes through the slot 104. Similarly as the platform is carried beyond the package stop 116 the projection means 120 passes through the notched opening 122 of the package stop 116. It is noted that the package pusher 106 is formed to avoid interference between the pusher and the projection means 120 as the wrapping machine is operated.

Figure 3A:
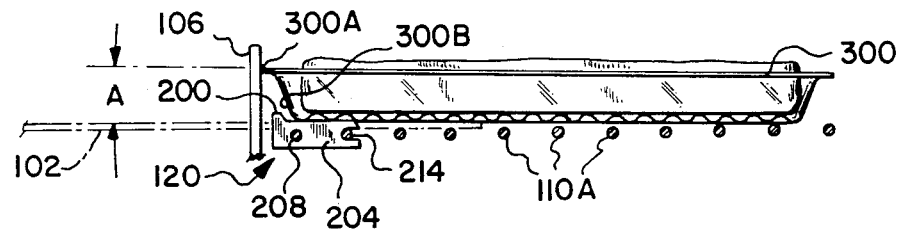
FIG. 3A is a sectional view showing the orientation of a tray relative to the ramped projection of the present invention as the tray is conveyed toward the wrapping station/elevator.

As shown in FIG. 3A, the incline 215 initially slides under a tray 300 so that the rear of the tray 300 is supported on the upper surface 216 of the block 204 which extends between the rods 208 and 214. The upper edge or lip 300A on a typical tray 300 extends considerably beyond the bottom edge 300B of the tray 300 such that the lip 300A engages the pusher 106 and the bottom edge 300B of the tray 300 is spaced slightly apart from the forward edge of the ramped projection 200. Thus, the tray 300 is inclined at a slight angle A toward the elevator 114 as the package is conveyed toward the package stop 116.

Figure 3B:
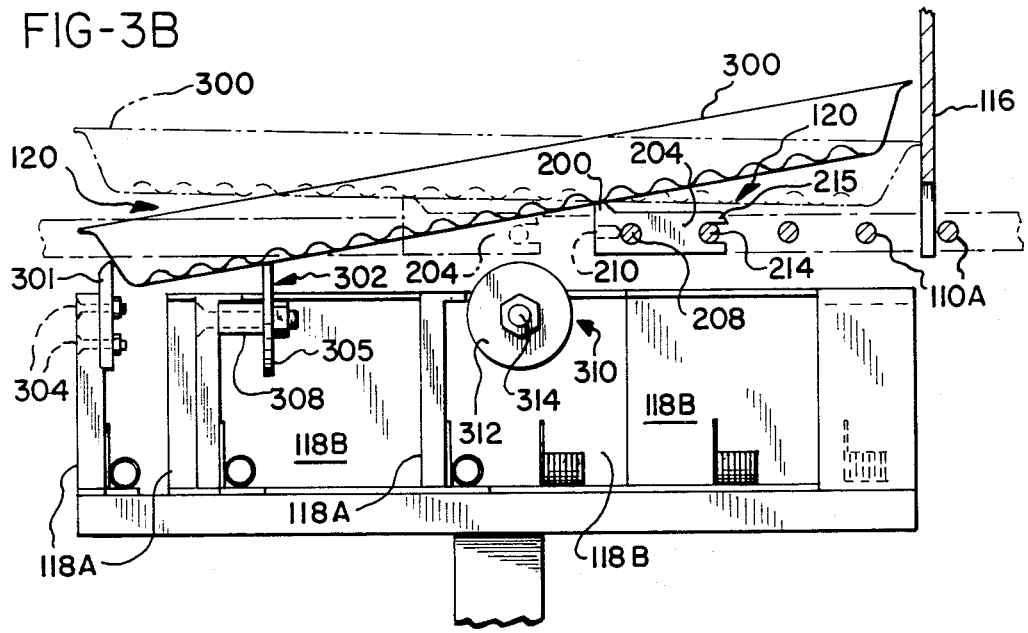
FIG. 3B is a sectional view of the ramped projection of the present invention passing beneath a trayed commodity positioned over the wrapping station/elevator.

FIG. 3B shows a sectional view of the tray 300 positioned over the elevator 114 as the projection means 120 passes beneath the tray. It will be noted that the tilt of the tray 300 initially increases due to the elevation of the ramped projection 200 as the projection means 120 passes beneath the tray 300 of the trayed commodity. The increased tilt of the tray 300 toward the stop 116 as shown in dashed lines tends to secure the package against the stop. However, once the projection means 120 has passed beyond approximately the center point of the tray 300, the tray then is inclined away from the package stop 116 and therefore tends to slide off the elevator 114.

To restrain the movement of the package as the projection means 120 passes thereunder beyond the center point, restraining means are incorporated into the elevator 114. The restraining means comprise projections extending above the vertically oriented slats 118 to engage the trays of trayed commodities and prevent them from sliding longitudinally off the elevator away from the package stop 116 and/or reduce lateral sliding parallel to the package stop 116. The bottom of the tray 300 is shown as being corrugated. Various patterns of such corrugations are a popular feature of plastic trays to both strengthen the trays and provide fluid receptacles for packaged commodities. The corrugations can also aid in package restrain by engaging the restraining means.

The restraining means in the longitudinal direction comprises a first projection 301 on the rearmost slat 118A of the elevator 114 for restraining large size trays. The longitudinal restraining means further comprises a second projection 302 on the penultimate rear collapsible slat 118A for smaller size packages.

The projections 301 and 302 in accordance with the present invention can be formed in a number of ways. For example, as shown in FIG. 3B, the projection 301 is a generally rectangular member having a curved portion extending above the rearmost slat 118A and being secured thereto by bolts 304. This is the preferred form of the rearmost projection such that packages initially engaging the projection 301 tend to slide up and over the projection as they are carried toward the package stop 116. The second longitudinal stop or projection 302 comprises a washer 305 which is secured to the penultimate rear collapsible slat 118A by means of a bolt 306 and a spacer 308.

The projections 301 and 302 tend to catch the rear edge of the tray 300 of a trayed commodity as shown in the solid line drawing of FIG. 3B and orevent the package from sliding off the elevator 114. FIG. 3B shows the angular orientation of the tray 300 relative to the elevator 114 in an exaggerated manner to emphasize the restraining function performed by the projections 301 and 302 for large and small trays, respectively.

The forces generated by collision of a trayed commodity with the package stop 116 may be both longitudinal and lateral. Accordingly, at least one lateral stop or projection 310 is also provided on the side collapsible slats 118B to engage the underside of the tray supporting a commodity to thereby reduce the lateral movement of the trayed commodity on the elevator 114. The lateral projections 310 are formed the same as the projection 302 by means of a washer 312, a connecting bolt 314 and a spacer (not shown) similar to the spacer 308. After a package has been correctly positioned on the elevator 114, the remainder of the wrapping procedure is carried out as disclosed in the above referenced U.S. patent application Ser. No. 371,892.

Operation of the improved package handling system will now be described. A package is placed on the feed-in tray 102 and engaged by the package pusher 106 with the upper surface 216 of the forward portion of the block 204 sliding beneath the rear end of the package to incline the package slightly toward the elevator 114. Due to an extended lip which defines the upper edge of the tray supporting a commodity to be wrapped, the forward face of the ramped projection 200 will typically be spaced apart slightly from the rearmost edge of the tray with the rear edge of the lip of the tray engaging the package pusher 106 (see FIG. 3A). The package pusher 106 advances the package 100 along the feed-in tray 102 and onto the advancing platform 110 comprising the rods 110A. The package is carried by the platform 110 toward the elevator 114 with the platform 110 passing beneath the lower edge of the package stop 116 to position the package 100 on the elevator 114.

As the forward edge of the lip or rim of the tray 300 engages the package stop 116, in the case of a resilient tray to which the supported commodity adheres, reaction forces will be generated tending to move the package away from the package stop 116. Upon bouncing or rebounding from the package stop 116, the lower edge 300B of the tray 300 engages the ramped projection 200 which catches the package and reduces the longitudinal movement of the package away from the package stop 116.

As the projection means 120 advances toward the package stop 116, the ramped projection 200 passes beneath the tray 300 initially increasing the tilt of the tray toward the stop 116 and, hence, urging it toward the stop. Any frictional force between the projection means 120 and the undersurface of the tray 300 tends to futher urge the tray toward the package stop 116. After the projection means 120 has passed approximately the midpoint of the tray 300 in passing toward the package stop 116, the package begins to tilt away from the package stop 116.

At this point, the lower edge of the package engages projection 301 and/or projection 302 to ensure that the package does not slide from the elevator. Any lateral forces on the tray 300 are similarly exerted against the projections 310 of the side collapsible slats 118B to reduce lateral movement of the package parallel to the package stop 116. The projection means 120 is carried by the platform 110 beyond the package stop 116 through the notched opening 122. Such operation in accordance with the present invention more accurately positions the trayed commodity upon the elevator 114 for correct wrapping.

While the forms of apparatus herein described constitute preferred embodiments of this invention, it is to be understood that the invention is not limited to these precise forms of apparatus and that changes may be made therein without departing from the scope of the invention which is defined in the appended claims.

What is claimed is:

1. In a high speed film wrapping machine wherein a trayed commodity is transported horizontally to a wrapping station on a horizontal conveying platform which travels beyond the wrapping station with the trayed commodity being deposited at the wrapping station by collision with a package stop, the package handling improvement comprising:
projection means coupled to said conveying platform for catching said trayed commodity upon rebound from said package stop due to the resiliency of the tray supporting said commodity and the collision with said stop and for urging said trayed commodity toward said stop whereby said trayed commodity is more accurately positioned at said wrapping station.

2. The improvement of claim 1 wherein said projection means comprises at least one ramped projection extending upwardly from the rear of said conveying platform, said ramped projection being formed to facilitate passage beneath said tray as said conveying platform travels beyond said package stop whereby said ramped projection presses said trayed commodity against said package stop and thereafter urges said trayed commodity toward said stop and said projection passes beneath said tray.

3. The improvement of claim 2 further comprising restraining means positioned at said wrapping station for retaining said trayed commodity at said wrapping station as said projection means passes beneath said trayed commodity.

4. The improvement of claim 3 wherein said restraining means comprises at least one projection for restraining said trayed commodity against movement longitudinally away from said package stop.

5. The improvement of claim 4 wherein said restraining means further comprises at least one projection for restraining said trayed commodity against lateral movement parallel to said package stop.

6. The improvement of claim 5 wherein said conveying platform comprises a plurality of parallel rods supported for travel in a direction perpendicular to said rods, said projection means comprising a generally rectangular block having at least one ramped projection extending upwardly from one end thereof and means for securing said block to at least the last of said rods.

7. The improvement of claim 6 wherein a hole is formed through said block for receiving the last of said rods therethrough and said securing means comprises a set screw threadedly engaged into said block and positioned to engage said last rod.

8. The improvement of claim 7 wherein said block comprises positioning means for pivotally receiving the penultimate of said rods.

9. The improvement of claim 8 wherein said positioning means comprises a slot open to the front of said block to receive the penultimate of said rods.

10. The improvement of claim 3 wherein said wrapping station comprises an elevator for receiving and elevating said trayed commodity, said elevator comprising hinged slats which are spring-biased to a generally vertical position to support said trayed commodity on the upper edges thereof, said hinged slats comprising at least one rear collapsible slat and at least two side collapsible slats, one side collapsible slat being associated with each side of said elevator and being collapsible from that side, to permit film to be folded under said tray, said restraining means comprising at least one projection on at least one rear collapsible slat for restraining said trayed commodity against movement longitudinally away from said package stop.

11. The improvement of claim 10 wherein said restraining means further comprises at least one projection on at least one of said side collapsible slats for restraining said trayed commodity against lateral movement parallel to said package stop.

12. The improvement of claim 6 wherein said wrapping station comprises an elevator for supporting and elevating said trayed commodity, said elevator comprising hinged slats which are spring-biased to a generally vertical position to support said trayed commodity on the upper edges thereof, said hinged slats comprising at least one rear collapsible slat and at least two side collapsible slats, one side collapsible slat being associated with each side of said elevator and being collapsible from that side, to permit film to be folded under said tray, said restraining means comprising at least one projection on at least one rear collapsible slat for restraining said trayed commodity against movement longitudinally away from said package stop.

13. The improvement of claim 12 wherein said restraining means further comprises at least one projection on at least one of said side collapsible slats for restraining said trayed commodity against lateral movement parallel to said package stop.

14. In a high speed film wrapping machine having a slotted package entrance tray, a package feed-in pusher repetitively passing through the slot of said tray to feed packages into said machine, at least one platform comprising a plurality of rods passing beneath said tray and synchronized with said pusher for receiving packages pushed from said tray and carrying the packages to a wrapping station, and a package stop positioned at said wrapping station such that packages are deposited at said wrapping station by collision with said package stop as said platform proceeds therebeyond, the improvement comprising:

a ramped projection sized to fit within the slot of said tray and being secured to the last of said rods and aligned with said slot whereby said trayed commodity is caught and urged against said package stop against collision rebound forces which tend to propel said trayed commodity away from said stop to thereby more accurately position said trayed commodity at said wrapping station.

15. The improvement of claim 14 wherein said ramped projection comprises a forward extension for pivotally receiving the penultimate of said plurality of rods to ensure the orientation of said ramped projection.

16. The improvement of claim 15 further comprising restraining means positioned at said wrapping station for retaining said trayed commodity at said wrapping station as said ramped projection is drawn under said trayed commodity.

17. The improvement of claim 16 wherein said restraining means comprises at least one projection for restraining said trayed commodity against movement longitudinally away from said package stop.

18. The improvement of claim 17 wherein said restraining means further comprises at least one projection for restraining said trayed commodity against lateral movement parallel to said package stop.

19. The improvement of claim 16 wherein said wrapping station comprises an elevator for receiving and elevating said trayed commodity, said elevator comprising hinged slats which are spring-biased to a generally vertical position to support said trayed commodity on the upper edges thereof, said hinged slats comprising at least one rear collapsible slat and at least two side collapsible slats, one side collapsible slat being associated with each side of said elevator and being collapsible from that side, to permit film to be folded under said tray, said restraining means comprising at least one projection on at least one rear collapsible slat for restraining said trayed commodity against movement longitudinally away from said package stop.

20. The improvement of claim 19 wherein said restraining means further comprises at least one projection on at least one of said side collapsible slats for restraining said trayed commodity against lateral movement parallel to said package stop.

* * * * *